July 18, 1967 R. BARESEL-BOFINGER 3,331,623
KNOCK-DOWN FURNITURE CONNECTOR
Filed Sept. 24, 1965 3 Sheets-Sheet 1

INVENTOR.
Rudolf Baresel-Bofinger
BY
Michael J. Striker

INVENTOR.
Rudolf Baresel-Bofinger

BY

Michael J. Striker

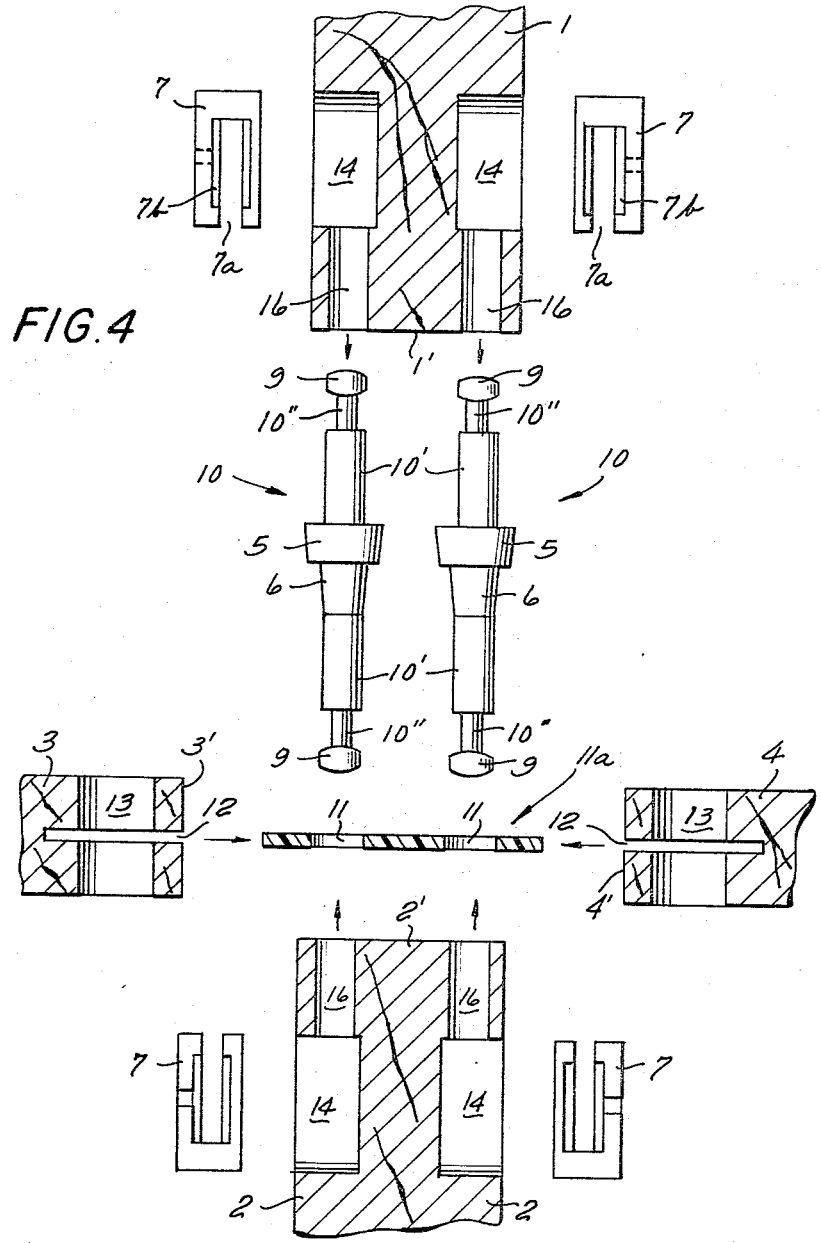

United States Patent Office 3,331,623
Patented July 18, 1967

3,331,623
KNOCK-DOWN FURNITURE CONNECTOR
Rudolf Baresel-Bofinger, Ilsfeld, near Heilbronn, Germany
Filed Sept. 24, 1965, Ser. No. 490,139
Claims priority application Germany, Sept. 29, 1964, B 78,707
14 Claims. (Cl. 287—20.92)

The present invention relates to furniture. More specifically, the invention relates to furniture which can be assembled from individual components in such a manner that the components can be disassembled if desired. Still more specifically, the invention relates to a means for releasably securing together the individual components of a piece of furniture which can be assembled and disassembled as desired.

In certain pieces of furniture, such as credenzas, bookshelves, wall hung assemblies and others, there is a growing trend to supply the piece of furniture in the form of individual components which can be assembled and disassembled at will. This is done both to facilitate packing and shipping of the furniture from the manufacturer to the purchaser, and also in view of the increasing mobility of the population which makes it desirable to have furniture which can be readily disassembled whenever a move to another location becomes desirable. In such furniture it is often necessary to secure together aligned panels, such as two panels which may constitute a wall, and frequently it is also necessary to fasten to the so secured panels additional panels which extend transversely thereto. For instance this may be found where two panels which constitute a vertical wall are to be joined to two panels which constitute a bottom or a shelf in a piece of furniture. Means for effecting such joining are of course known. However, such means as screws are not really suitable in cases where furniture is to be assembled and disassembled repeatedly because, for example in the case of screws, the material in which the screw threads engage eventually becomes worn, the screw hole becomes too large, and the joint is no longer a tight one.

It is a general object of the present invention to overcome the drawbacks of existing joining means.

A more specific object of the present invention is to provide a joining means which will secure panels, whose respective end faces face one another, in tight relationship and will prevent loosening of the joint over a period of time or through repeated assembly and disassembly of the components involved.

In accordance with the inventive concept one feature of the invention resides in a piece of furniture or the like, in the provision of a pair of structural members which have opposed end faces, these members being provided with aligned bores which extend inwardly of the end faces and being further provided with recesses which communicate with the bores. There is further provided spacer means interposed between the end faces of the structural members, elongated connector means whose opposite end portions are each provided with cam follower means and extend through one of the bores and into the respective recess of the structural member, and tensioning means which is located in these recesses and has cam portions which engage the respective follower means and thereby subject the connector means to tensile stress whenever the tensioning means is moved with reference to the respective member. This serves to bias the end faces of the structural members against the spacer means and thus effects a very tight joint.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 4 is an exploded view, partly in section, of the embodiment of FIG. 1, showing the individual components involved;

Figure 1:
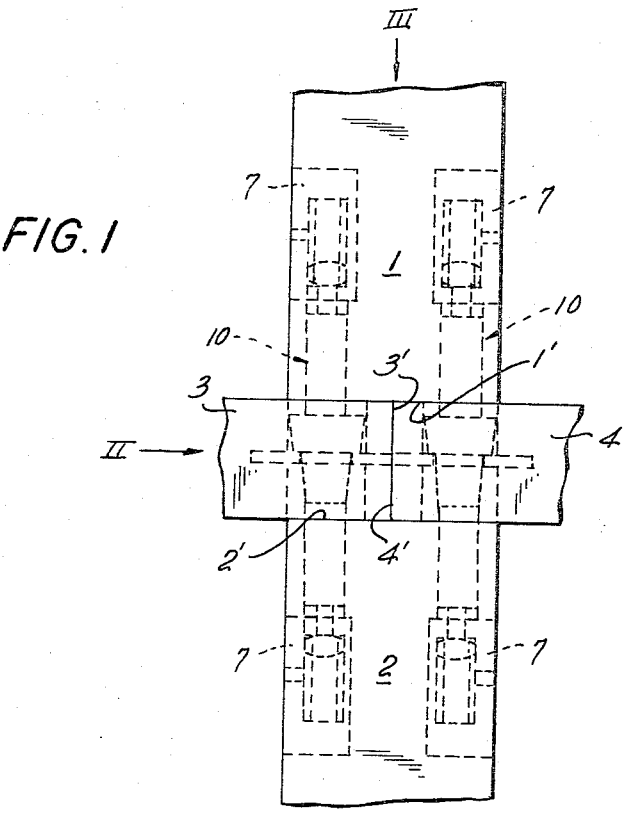
FIG. 1 is a front view of four panels which are joined in accordance with the present invention.

As shown in FIG. 1 of the drawing a pair of vertically aligned panels 1 and 2, which for the sake of convenience may be thought of as wall members, are to be joined with a pair of transversely or horizontally aligned panels 3 and 4, which for convenience may be thought of as shelf members. The arrangement is such that the end faces 3′ and 4′ of the members 3 and 4 abut with one another and that the end portions adjacent these end faces are interposed between the end faces 1′ and 2′ of the vertical panels 1 and 2. In other words, FIG. 1 represents a cross joint of the members 1 and 2, and 3 and 4, respectively. Referring now to FIG. 4 the construction of this joint will be seen more clearly. Each of the members 1 and 2 is formed in the respective end face thereof with a pair of spaced-apart bores 16 which upwardly of the end faces widen into recesses 14 communicating with the bores. It will be seen that the recesses 14 extend transversely of the bores and are spaced from the respective end faces of the members 1 and 2. There are further provided the connector means 10, one for each of the aligned bores 16. These connector means 10 basically comprise a cylindrical portion 10′ on whose opposite ends there is formed a portion or neck 10″ of a diameter less than the diameter of portion 10′. Formed on, or secured to the respective necks 10″ are knobs or heads 9 which have a diameter again greater than that of the neck 10″ but not exceeding that of the bores 16. Approximately at its midpoint each of the cylindrical portions 10′ is provided with a portion 5 of greater diameter than the portion 10′ and which tapers in the direction towards one end thereof. Another tapering portion, tapering in the same direction, may be provided directly adjacent the portion 5 and is designated with reference numeral 6. Both of these portions 5 and 6 may be integral with the portion 10′ or the latter may be formed with screw threads and the portions 5 and 6 may be formed with internal mating threads and may be threadedly secured on the portion 10′.

The transversely extending members 3 and 4 will be seen to be formed inwardly of their respective end faces 3′ and 4′ with throughgoing bores 13 whose diameters are such as to accommodate the portions 5 of the connecting members 10. It will be obvious that the members 10 are inserted through the bores 13 before they are inserted into the respective bores 16 of the members 1 and 2, so that each of the bores 13 in one of the transversely extending members is aligned with the bores 16 of the members 1 and 2. The members 3 and 4 are further provided in their respective end faces 3′ and 4′ with slots 12 which extend inwardly of these end faces and are so deep as to extend even inwardly of the respective bores 13. These slots are provided so as to accommodate a connecting plate 11a (see FIG. 5) which is formed with a pair of apertures 11 of a size large enough to accommodate the portions 10′ of the connecting members 10, but not to accommodate the portions 5 or 6 thereof.

Figure 5:
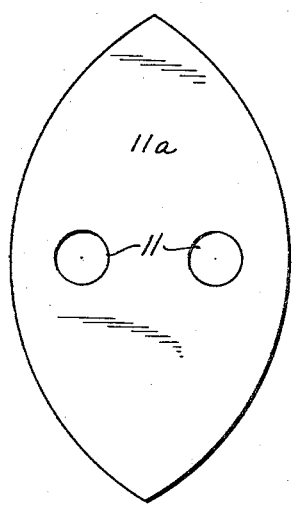
FIG. 5 is a top plan view of one element of the inventive joining means.

The connecting plate 11a may have the over-all configuration of two oppositely directed sections of arc whose radii are identical. The configuration of the slots 12 will, of course, be complementary thereto. Although this configuration is by no means the only one possible, it has been found that it is advantageous because the slots 12 can be cut with a rotating circular tool, such as a circular saw and will then require no further work if the connecting plate is configured as shown in FIG. 5.

Figure 6:
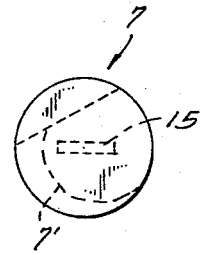
FIG. 6 is a detail view of yet another component of the inventive fastening means.

Finally, there is shown locking means 7 which is received in the respective recesses 14 of the members 1 and 2. As is more clearly evident from FIG. 6 the locking means 7 is disk-shaped. Referring back again to FIG. 4 it will be seen that the locking means 7 is slotted over part of its circumference so as to form an opening 7a which is wide enough to permit entry therein of the neck portion 10" of the connector means 10. Inwardly of this opening 7a the slot widens and forms the space 7b which is wide enough to accommodate the head 9 of a connector means 10. Of course, at one peripheral point the opening 7a must be made large enough to admit the head 9 to the inner and larger opening 7b. The inner opening 7b is formed in such a way, as shown in FIG. 6 in broken lines, as to form a cam face 7'. The disks 7 are also formed in one of the major faces thereof with a recess or groove 15 which may accommodate the point of a tool, such as a screwdriver.

The assembly of this joint will be clear. The members 1 and 2 are aligned with one another, the members 3 and 4 are also aligned with one another and the connecting plate 10 is so inserted into the slots 13 that its apertures 11 are aligned with the respective bores 13 of the members 3 and 4. Now the connector means 10 is inserted into the respective bores 13 and through the corresponding aperture 11 and bore 16 of member 2 until the head 9 becomes lodged in the recess 14. Now the opposite head 9 of the same connecting means 10 is inserted through the bore 16 in member 1 until it becomes lodged in the recess 14 of that member. The tensioning disks 7 are now inserted into the respective recesses 14 of the members 1 and 2 in such a manner that the heads 9 of the connecting means become lodged in the larger interior spaces 7b. Of course, the identical operation will have been performed for the other connecting means 10 and the transverse member associated with it. Now the disks 7 are rotated in the recesses 14 by inserting the tip of a tool, such as a screwdriver, into the grooves 15 and turning the disks. The heads 9 of the connecting means 10 are thereby engaged by the internal cam face 7 of each disk and an axial tension is applied to the connecting means 10. This will cause the members 1 and 2 to be pulled closer together with their end faces 1' and 2' abutting against the end portions of the transverse members 3 and 4 which are received between these end faces. As this axial tensioning of the members 10 takes place the portions 5 and 6 of these members will be completely drawn into the respective bores 13 of the transverse members or panels 3 and 4. Since the apertures 11 of plate 11a are somewhat eccentric relative to the bores 13 when the plate 11a is received in the slots 12, in other words, since the axis of each aperture 11 is offset slightly towards the respective end faces of the members 3 and 4, penetration of the portions 5 and 6 into the bores 13 will exert a transverse or horizontal tension on the plate 11a. In turn, this effect will have the result of exerting tension on the members 3 and 4 in a sense tending to urge the end faces 3' and 4' thereof into tighter abutment with each other. Thus, the cross joint so formed is extremely rigid but is yet very readily releasable. Also, there is nothing to wear out or loosen so that this joint can be tightened and released many times without affecting its tightness.

Figure 2:
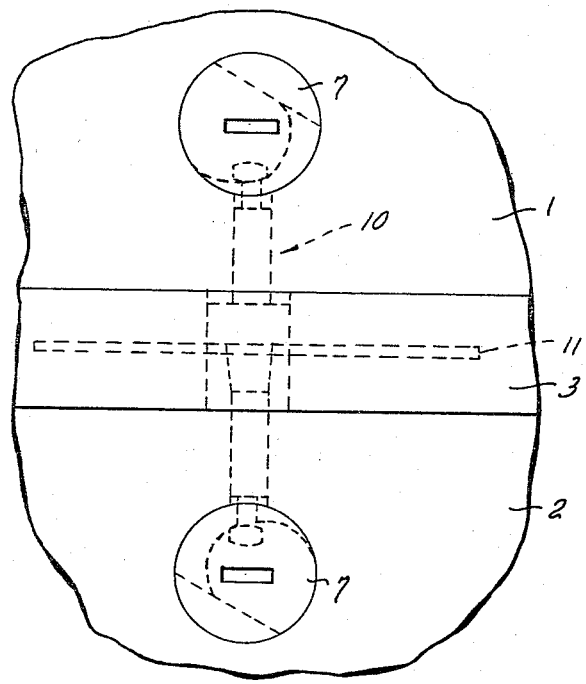
FIG. 2 is a side view of the embodiment of FIG. 1, taken in the direction of the arrow II.
Figure 3:
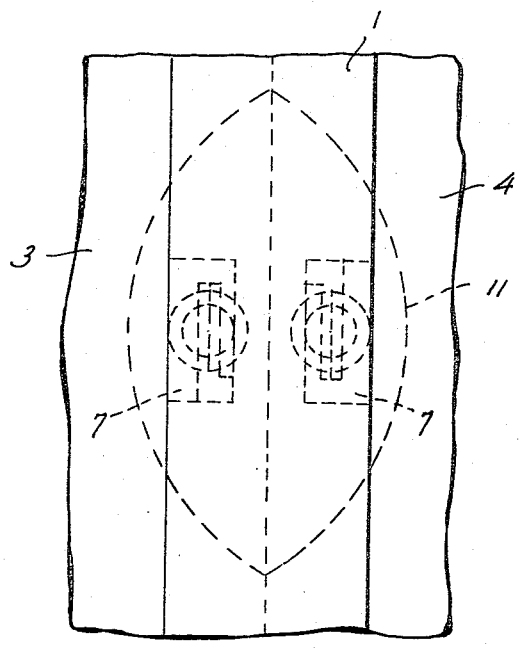
FIG. 3 is a top plan view of the embodiment of FIG. 1 taken in the direction of the arrow III.

FIGS. 2 and 3, which have been added to more clearly show the position of the respective members of the joint in assembled condition thereof, are believed to be self explanatory.

It will be understood, of course, that modifications of the invention are readily possible and are to be encompassed by this disclosure. Also, it will be understood that various materials may be suitable for construction of the members which constitute the inventive locking means. It is preferred, for instance, to construct the plate 11a from a synthetic resin with high tensile strength and such resin may incorporate a fibrous carrier and reinforcing layer. The disks 7 may be made of metal or other suitable materials as is the case with the connecting means 10.

It will be understood that each of the elements described above, or two or more together, may also find a useful application in other types of pieces of furniture differing from the types described above.

While the invention has been illustrated and described as embodied in a piece of furniture, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A piece of furniture or the like, including a first structural member having a face provided with a first bore extending inwardly thereof; a second structural member movable relative to said first member and having a portion adapted to overlie said face, said second structural member having a second bore movable into at most partial registry with said first bore; a connector receivable in said bores for connecting said members to one another; and biasing means arranged to transmit to said second member via said connector a biasing force having a first component of force urging said second member against said face of said first member, and a second component of force acting substantially at right angles to said first component and urging said members to move relative to one another in a sense tending toward substantial alignment of said bores.

2. A piece of furniture as defined in claim 1, wherein said connector is an elongated element comprising a shank and an engaging portion provided on said shank for engaging said second structural member.

3. A piece of furniture as defined in claim 2, wherein said shank has a free end portion spaced from said engaging portion and located in said first bore, said element further comprising an additional engaging portion provided on said free end portion; and wherein said biasing means includes means for engaging said additional engaging portion and for urging said connector deeper into said second bore in direction away from said face.

4. A piece of furniture as defined in claim 3, further comprising a recess provided in said first structural member and communicating with said first bore inwardly of said face; said biasing means including a tensioning element provided in said recess and having cam portions adapted to engage said additional engaging portion for subjecting said connector to tensile stress in response to movement of said tensioning element with reference to said first structural member.

5. A piece of furniture as defined in claim 3, further comprising a recess provided in said first structural member and communicating with said first bore inwardly of said face; said biasing means including a tensioning element provided in said recess and having cam portions adapted to engage said additional engaging portion for subjecting said connector to tensile stress in response to movement of said tensioning element with reference to said first structural member, and said biasing means further including an inclined cam face provided on said engaging portion and arranged to cammingly engage the peripheral face surrounding said second bore in said second structural member in response to exertion of tensile stress on said connector by said tensioning element, whereby said second member is urged in direction toward said first member and simultaneously moves transversely of such direction toward substantial registry of said bores.

6. A piece of furniture or the like, comprising a pair of structural members having opposed end faces each provided with two spaced bores extending inwardly therefrom and with two recesses communicating with said bores; spacer means interposed between said end faces and including a pair of elongated panels extending normal to said structural members and having respective end portions provided with opposite end faces, said panels being provided with respective through-going apertures in said end portions and extending parallel to said opposite end faces thereof, said apertures being aligned with said bores in the assembled condition of said piece of furrniture; elongated connector means each having opposite end portions received in respective bores of said structural members and a median portion extending through said apertures, said end portions having a given cross-sectional area and including a terminal portion on each of said end portions and having a cross-sectional area greater than said end portions so as to extend transversely therebeyond, said terminal portions respectively constituting cam-follower means; and tensioning means comprising respective disks received in said recesses and rotatable therein, said disks being recessed and having a cam face provided in such recess, said terminal portions extending into the respective recesses and the cam face in each recess engaging the respective terminal portions in response to angular displacement of the respective disc relative to the respective member to thereby subject said connectors to tensile stress in response to angular displacement, whereby said end faces of said members are biased against said panels.

7. A piece of furniture as defined in claim 6, wherein said end faces of said panels are provided with arcuate slots extending inwardly of said end faces into and beyond said passages, and wherein said spacer means further comprises a coupling plate complementary to said slots and received therewithin, said coupling plate being provided with apertures registering with but smaller than said passages and said median portions of said connector members extending through said apertures and said passages and thereby securing said panels together.

8. A piece of furniture as defined in claim 7, wherein said median portions of said connector members have a given cross-sectional area and comprise at least one tapering section having a larger cross-sectional area, said passages having a cross-sectional area complementary to said tapering sections and said apertures having a cross-sectional area smaller than said passages so that when said connector members are received in said passages and apertures of said panels and plate and axial tension is applied to said connector members, said tapering section will tend to draw said plate deeper into said slots thereby applying tension in the plane of said plate and biasing the end faces of said panels against each other.

9. In a piece of furniture or the like, a pair of structural members being provided with respective pairs of aligned bores extending inwardly of said end faces and with recesses communicating with said bores transversely thereto and spaced from said end faces; a pair of panels having respective end portions each having a terminal face, said end portions being interposed between said end faces of said structural members and being provided with throughgoing passages registering with said bores, said panels being further provided with respective slots extending from said terminal faces into said panels to such a depth as to intersect the respective passage and to extend inwardly therebeyond; a plate complementary to said slots in substantially abutted condition of said terminal faces and receivable in said slots, said plate being provided with a pair of apertures smaller than and registering with said passages of said panels; connector means connecting said structural members and said panels, said connector means including elongated connector members each having opposite end portions received in the respective bore and provided with a head portion located in the corresponding recess of one of said members, and an intermediate portion received in one of said passages of said panels and thereby passing through a registering aperture of said plate, said intermediate portion having a section of tapering cross-sectional area; and tensioning means located in said recesses, said tensioning means comprising disk-shaped members each being provided with a cam face adapted to engage the head portion of the corresponding connector member so as to exert axial stress thereon upon rotation of the disk relative to the respective member whereby, when such stress is exerted on the respective connector member in the direction in which the section of its intermediate portion tapers, said end faces of said structural members will be biased against said end portions of said panels, and engagement of said section with the wall of the respective passage will tend to exert transverse stress on said plate, thereby biasing said terminal faces of said panels against each other.

10. A piece of furniture as defined in claim 9, wherein said slots are arcuate.

11. A piece of furniture as defined in claim 9, wherein said disks are each provided with an axial groove facing outwardly from the respective recess and adapted to receive a portion of a tool therein so as to facilitate rotating of the respective disk.

12. A piece of furniture as defined in claim 9, wherein said section of tapering cross-sectional area of each of said connector members is hollow and provided with internal threads, and wherein said connector members are provided with external threads, said sections being threaded onto the respective connector members.

13. A piece of furniture as defined in claim 9, wherein said disk-shaped members consist of a synthetic plastic material having high tensile strength.

14. A piece of furniture as defined in claim 9, wherein said plate has the shape of a pair of oppositely directed sections of arc of identical radius.

References Cited

UNITED STATES PATENTS 2,967,747   1/1961   Bus _____ 312—257

ROY D. FRAZIER, *Primary Examiner.*

CHANCELLOR E. HARRIS, *Examiner.*

F. DOMOTOR, *Assistant Examiner.*

UNITED STATES PATENT OFFICE
CERTIFICATE OF CORRECTION

Patent No. 3,331,623　　　　　　　　　　　　　　July 18, 1967

Rudolf Baresel-Bofinger

It is certified that error appears in the above identified patent and that said Letters Patent are hereby corrected as shown below:

Column 2, lines 71 and 72, "the portions 10' of the connecting member 10, but not to accommodate the portions 5 or 6 thereof" should read -- the portions 10' and 6 of the connecting member 10, but not to accommodate the portions 5 thereof --. Column 3, line 31, "plate 10" should read -- plate 11a --.

Signed and sealed this 21st day of October 1969.

(SEAL)
Attest:

Edward M. Fletcher, Jr.
Attesting Officer

WILLIAM E. SCHUYLER, JR.
Commissioner of Patents